US009586632B2

(12) United States Patent
Barsotti et al.

(10) Patent No.: US 9,586,632 B2
(45) Date of Patent: Mar. 7, 2017

(54) OPTIMIZING JETS FOR WAKE CONTROL OF GROUND VEHICLES

(71) Applicant: Embry-Riddle Aeronautical University, Inc., Daytona Beach, FL (US)

(72) Inventors: Domenic Barsotti, Vineland, NJ (US); Sandra Boetcher, Daytona Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 0 days.

(21) Appl. No.: 14/938,910

(22) Filed: Nov. 12, 2015

(65) Prior Publication Data

US 2016/0137234 A1    May 19, 2016

Related U.S. Application Data

(60) Provisional application No. 62/123,329, filed on Nov. 14, 2014.

(51) Int. Cl.
*B62D 35/00* (2006.01)
*B62D 37/02* (2006.01)

(52) U.S. Cl.
CPC ............. *B62D 35/00* (2013.01); *B62D 37/02* (2013.01)

(58) Field of Classification Search
CPC ........ B62D 37/02; B62D 35/00; B62D 35/02; B62D 35/001; B62D 35/007; B62D 35/008

(Continued)

(56) References Cited

U.S. PATENT DOCUMENTS 2,037,942 A    4/1936    Stalker
2,514,695 A *  7/1950    Dempsey ........... B62D 33/0612
                                              105/1.2

(Continued)

FOREIGN PATENT DOCUMENTS

EP    0 420 826 A1    4/1991
EP    1 506 911 A1    2/2005

(Continued)

OTHER PUBLICATIONS

Wikipedia, article titled "Difuser (thermodynamics)", https://en.wikipedia.org/wiki/Diffuser_(thermodynamics), Jun. 30, 2016.*

(Continued)

*Primary Examiner* — Dennis H Pedder
(74) *Attorney, Agent, or Firm* — Womble Carlyle Sandridge & Rice, LLP

(57) ABSTRACT

A system of wake control for a ground vehicle to help promote increased fuel efficiencies of the ground vehicle by modifying an air flow wake generated during the movement of the vehicle in a forward direction. The system includes at least one slot jet configured to be located along a rear profile portion of the ground vehicle. The at least one slot jet is configured to provide a continuous flow of air at a non-zero velocity when the ground vehicle is moving in a forward direction, the non-zero velocity being at least partially directed in a rearward direction with an output velocity less than a velocity at which the ground vehicle is moving in the forward direction, but sufficient to modify the air flow wake generated by the movement of the ground vehicle in the forward direction.

16 Claims, 9 Drawing Sheets

(58) Field of Classification Search
USPC .................................. 296/180.1–180.5, 91
See application file for complete search history.

(56) References Cited

U.S. PATENT DOCUMENTS

| | | | |
|---|---|---|---|
| 3,960,402 A * | 6/1976 | Keck .................... | B62D 35/001 |
| | | | 105/1.2 |
| 4,056,279 A * | 11/1977 | Dorsch ................ | B62D 35/001 |
| | | | 105/1.2 |
| 5,407,245 A | 4/1995 | Geropp | |
| 5,820,203 A * | 10/1998 | Morelli ................... | B60C 23/18 |
| | | | 180/903 |
| 5,908,217 A | 6/1999 | Englar | |
| 8,616,615 B2 | 12/2013 | Seifert et al. | |
| 9,139,238 B2 * | 9/2015 | Visser .................. | B62D 35/001 |
| 2014/0110967 A1 | 4/2014 | Seifert et al. | |
| 2015/0008699 A1* | 1/2015 | Yamaguchi ............ | B62D 37/02 |
| | | | 296/180.1 |

FOREIGN PATENT DOCUMENTS

| | | | |
|---|---|---|---|
| EP | 1 544 089 A1 | | 6/2005 |
| FR | 2 859 160 A1 | | 3/2005 |
| FR | 2890639 | * | 9/2005 |
| FR | 2 888 199 A1 | | 1/2007 |
| FR | 2 890 637 A1 | | 3/2007 |
| WO | WO 2007/088310 A1 | | 8/2007 |
| WO | WO 2014/130425 A1 | | 8/2014 |

OTHER PUBLICATIONS

Wayback machine, dated origin of the above article, 2006.*
Joseph, Pierric, Amandolese, Xavier & Aider, Jean-Luc; Drag Reduction on the 25 Slant Angle Ahmed Reference Body Using Pulsed Jets; Experiments in Fluids, Experimental Methods and their Applications to Fluid Flow; ISSN 0723-4864, vol. 52, No. 5, Exp Fluids (2012) 52:1169-1185, DOI 10.1007/s00348-011-1245-5; Jun. 11, 2011; Springer Verlag; France.
Hangeng, Wang, Mengxia, Xu; Control of the Aerodynamic Drag of Ahmed Model with Slot Jet; The Seventh International Colloquium on Bluff Body Aerodynamics and Applications (BBAA7) Shanghai, China; Sep. 2-6, 2012.

* cited by examiner

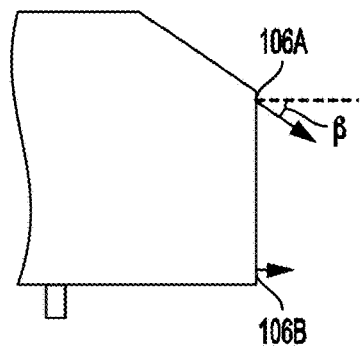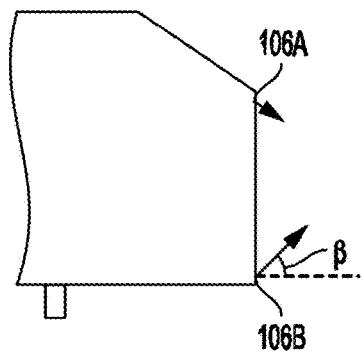
FIG. 3A    FIG. 3B
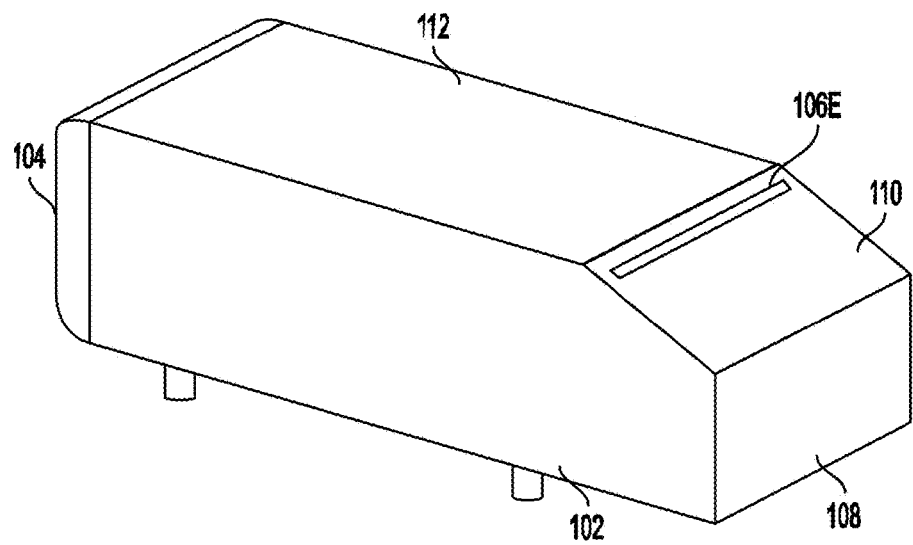
FIG. 4

OPTIMIZING JETS FOR WAKE CONTROL OF GROUND VEHICLES

CROSS REFERENCE TO RELATED APPLICATIONS

The present Patent Application is a formalization of previously filed, U.S. Provisional Patent Application Ser. No. 62/123,329, filed Nov. 14, 2014 by the inventors named in the present Application. This Patent Application claims the benefit of the filing date of this cited Provisional Patent Application according to the statutes and rules governing provisional patent applications, particularly 35 U.S.C. §119 (e), and 37 C.F.R. §§1.78(a)(3) and 1.78(a)(4). The specification and drawings of the Provisional Patent Application referenced above are specifically incorporated herein by reference as if set forth in their entirety.

FIELD OF THE DISCLOSURE

The present invention generally relates to a system for improving the aerodynamic drag of ground vehicles, and in particular to a system of wake control of ground vehicles to reduce drag and correspondingly improve fuel efficiency of such vehicles.

BACKGROUND OF THE DISCLOSURE

Current government regulations have significantly increased the required fuel efficiency for the automobile industry. This has become prevalent in the development of hybrid vehicle systems and more efficient engine designs. Another area that can be exploited for the reduction of fuel consumption is in the area of vehicle aerodynamics. At speeds above 50 mph, aerodynamic drag becomes the leading negative force acting on the vehicle. It is therefore a viable option to explore drag reduction systems to increase a vehicle's fuel economy. Passenger vehicles produce similar drag characteristics which are characterized by large areas of flow separation at the rear of the vehicle.

Similar to automobiles, bluff bodies share a drag profile with a large area of flow separation at the rear of the body. In order to better understand the air flow characteristics of an automobile, a simplified geometry now referred to as an "Ahmed body" has become a standard benchmark for automotive aerodynamic studies. The developers of this profile, Ahmed et al., discussed the flow characteristics of a bluff-body with rear slant angles between 0° and 90°.

Many studies have been conducted to reduce drag on Ahmed and Ahmed-like bodies using passive control techniques by changing the shape of or adding appendages to the vehicle. For example, a prior study by Verzicco et al. used large-eddy simulation (LES) to examine the effect of devices attached to the base of the vehicle on drag, achieving a 31% drag reduction using a boat-tail device. Another study by Beaudoin and Aider used moving flaps attached to the rear edges of the Ahmed body and found that some configurations achieved a 25% drag reduction.

Further, Gillieron et al. experimentally and analytically investigated the effect of slant angle on the swirling structures in the wake. Using a roughness array placed on the roof of the Ahmed body to produce streaks, Pujals et al. reduced the drag by 10%. Fourrie et al. used an automotive deflector and achieved drag reduction of 9%. In another approach, Bruneau et al. placed porous material on the rear of a square-back Ahmed body and found drag reduction up to 37%. More recently, Thacker et al. changed the shape of the rear slant and found that this reduced drag by 10%.

Such passive techniques, however, typically result in visually unacceptable modifications and appendages to the vehicle bodies, and thus the automotive industry has turned to active drag reduction techniques. Many active flow control techniques such as jets, pulsed jets, and devices to create suction are currently being implemented and characterized. For example, Brunn and Nitsche used diffusers to induce periodic forcing in order to control the flow separation over the slant of the Ahmed body, but only reported on velocity fluctuations and vortex shedding frequencies, and not drag coefficients. Roumeas et al. used a Lattice Boltzman method (LBM) to numerically determine the flow field around Ahmed-like car bodies and investigate suction where a drag reduction of 17% was achieved, and blowing where a drag reduction of 29% was obtained.

Other investigators, such as Krentel et al. used periodically-blowing compressed air actuators on the Ahmed body and achieved a total drag reduction of 5.7%. Aubrun et al. used a steady microjet array along the slant angle of the Ahmed body to reduce the drag coefficient by 14%. Littlewood and Passmore studied the effect on drag of the angle of attack of a slot jet located at the top edge of a square-back vehicle. They found that a jet pointed downwards from the horizontal was the only configuration to reduce the drag. Most recently, Joseph et al. used pulsed jets to achieve an 8% drag reduction. Finally, Bruneau et al. investigated a hybrid passive-active control strategy for reducing drag by using porous layers below the body and active jets. These investigators achieved a maximum drag reduction of 26%.

There remains a need for additional wake control systems for optimization thereof.

SUMMARY

Embodiments of the present disclosure include a system of wake control for a ground vehicle to help promote increased fuel efficiencies of the ground vehicle. The system comprises at least one slot jet configured to be located along a rear profile portion of the ground vehicle. The at least one slot jet provides a continuous flow of air at a non-zero velocity when the ground vehicle is moving in a forward direction. The non-zero velocity is at least partially directed in a rearward direction with an output velocity less than a velocity at which the ground vehicle is moving in the forward direction, but with an output velocity sufficient to modify an air flow wake generated by the movement of the ground vehicle in the forward direction.

Other embodiments of the present disclosure include a ground vehicle. The vehicle comprises a vehicle body having a substantially horizontal top surface, a substantially vertical rear face and a slant surface extending at least indirectly between the top surface and the vertical rear face, the slant surface declined at a slant angle of α to the horizontal. The vehicle also includes at least one slot jet positioned on at least one of the rear face and/or the slant surface of the vehicle body and configured to provide a substantially continuous flow of air in a direction and at a speed sufficient to substantially disrupt an air flow wake created by movement of the vehicle body in a forward direction. Additionally, an initial speed of the flow of air is less than a speed of the vehicle body moving in the forward direction.

Additional embodiments of the present disclosure include methods of increasing the fuel efficiency of a ground vehicle. An exemplary method may comprise reducing the drag on the ground vehicle at speeds above 45 mph, where the ground vehicle includes a vehicle body having a substantially horizontal top surface, a substantially vertical rear face, and a slant surface extending at least indirectly between the top surface and the vertical rear face, the slant surface declined at a slant angle of a to the horizontal. The step of reducing drag comprises locating a first slot jet on the slant surface and generating a continuous flow of air from the first slot jet at an angle substantially perpendicular to the slant surface.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

BRIEF DESCRIPTION OF DRAWINGS

FIGS. 3A and 3B illustrate flow from the slot jets of FIG. 2 according to various embodiments.

FIG. 4 illustrates a slot jet on a rear slant of the rear end profile of the vehicle body of FIG. 1.

Those skilled in the art will appreciate and understand that, according to common practice, the various features of the drawings discussed below are not necessarily drawn to scale, and that the dimensions of various features and elements of the drawings may be expanded or reduced to more clearly illustrate the embodiments of the present invention described herein.

DETAILED DISCUSSION

The current disclosure is directed to a system and method for achieving a drag reduction on a vehicle body by utilizing wake control with the use of slot jets on the rear surface of the vehicle body. The slot jets emit air on a continuous, constant, or steady basis. In other words, the slot jets (i.e. the outlets thereof) do not pull in air, nor are the slot jets configured to be specifically pulsed or oscillated. The slot jets may emit air in a passive, unassisted manner, or may blow air at least partially in an active, fan-assisted manner. Simulations were modeled with the use of the Improved Delayed Detached Eddy Simulation (IDDES) turbulence model, utilizing an "Ahmed body," as discussed below, as the configuration for the ground vehicle.

Figure 1:
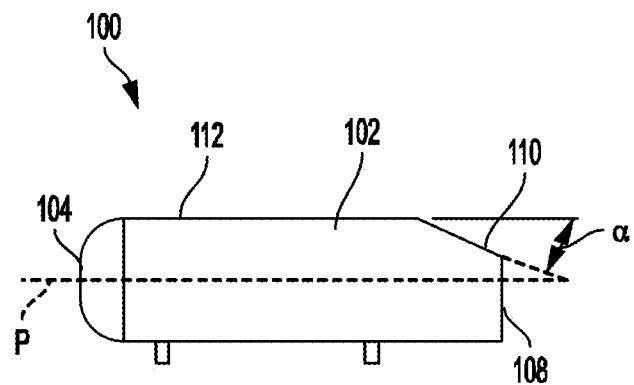
FIG. 1 illustrates one embodiment of a vehicle body, configured as an Ahmed body with 25° rear slant, in accordance with the principles of the present disclosure.
Figure 2:
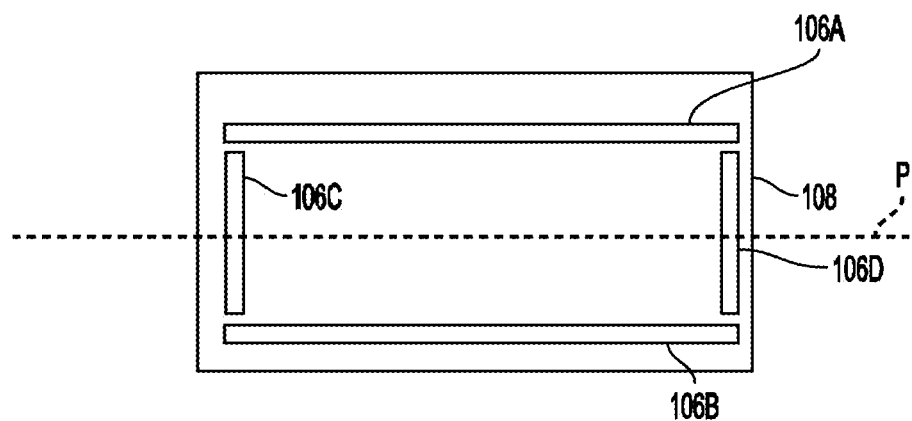
FIG. 2 illustrates an embodiment of slot jet locations on the rear end profile of the vehicle body of FIG. 1.
Figures 13, 14:
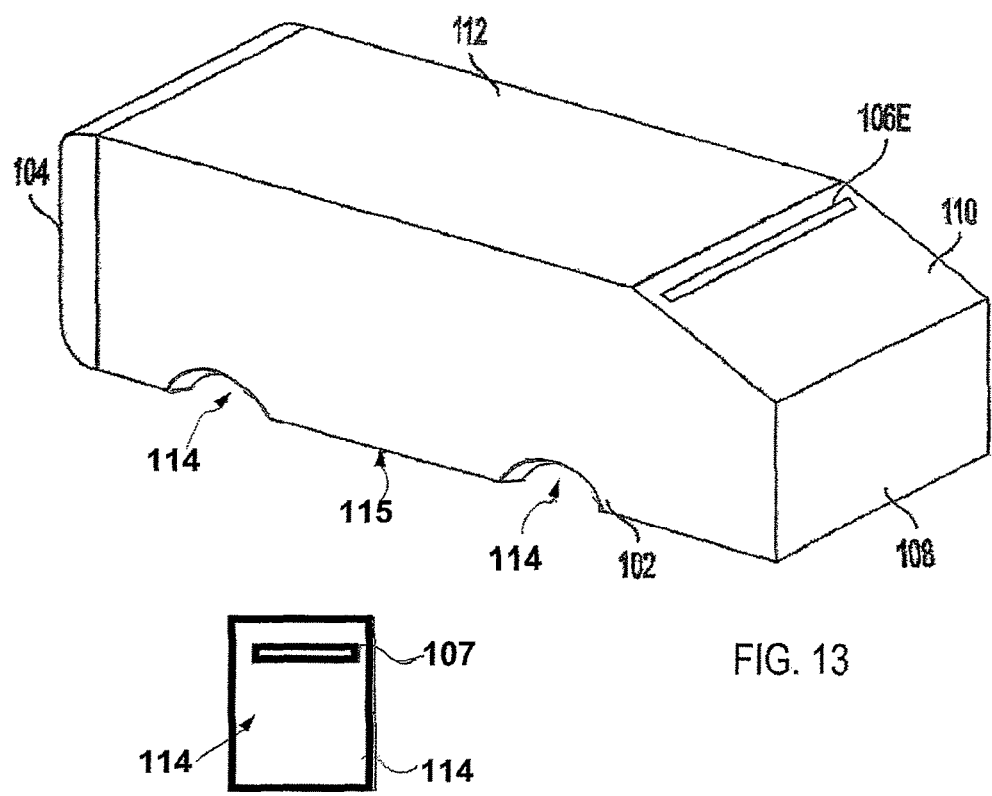
FIG. 13 illustrates one embodiment of a vehicle body with wheel wells.
FIG. 14 illustrates the real wheel well of FIG. 13 with an inlet positioned therealong.

Referring to the Figures, FIG. 1 illustrates an example vehicle body 100 according to one embodiment of the invention, shown as an elongated Ahmed body having a sloping or slanted rear end profile 102, and a rounded, generally convex front end profile 104; though it will be understood that other vehicle body configurations also can be used. The vehicle body 100 further will be provided with a series of slot jets 106A-E (FIGS. 2 and 4) positioned at selected locations along and/or adjacent the rear face 108 and/or the slant surface 110 of the rear end profile 102 of the vehicle body. The type, velocity, position and/or location, size, and angle of the slot jets 106A-E further will be selected as discussed below. The slot jets 106A-E are configured to provide air flows through/along the rear of the vehicle body 100 sufficient to modify and counteract the wake air flows generated by the vehicle body moving in a first direction through ambient air, to reduce aerodynamic drag acting thereon. The slot jets 106A-E can each have a single elongated opening, or a slot jet can comprise a plurality of discharge openings generally arranged collinearly, to collectively act as an elongated slot. As seen in FIGS. 2 and 4, the slot jets 106A, B, and E may each have a length covering at least a majority of the width of the vehicle body 100, for example approximately 75% of the width. The slot jets 106A-E may be configured to emit air using a passive system where flow is created as a result of a pressure difference between an area of low pressure at an outlet of each slot jet 106A-E, such as along the rear of the vehicle body, and an area of high pressure, such as at an inlet 107 positioned within the rear wheel well 114 of a passenger vehicle, as generally shown in FIGS. 13-14. The inlet 107 can be positioned along a surface 114A of rear wheel well 114 (FIG. 14). The rear wheel well 114 is known to be substantially adjacent to a bottom surface 115 of the vehicle body or undercarriage of the vehicle (FIG. 13). In some embodiments a fan may be included between the inlet and the outlet of each slot jet 106A-E to actively assist with creating the desired flow velocity, i.e. initial output velocity, through each slot jet.

As shown in FIG. 1, the slanted rear end profile 102 generally will include an upper sloped or slant surface 110, extending from a top surface 112 of the vehicle body 100 downwardly to a substantially flat rear face 108. The flat rear face 108 also can extend from a lower edge of the slant surface 110 to the bottom edge of the vehicle body 100. The vehicle body 100 may or may not have inwardly slanted/tapering sides and/or an upwardly sloping bottom or lower section of the rear end profile 102.

According to one embodiment, the vehicle body 100 is configured with a 25° slant angle α for the slant surface 110 of the rear end profile 102 of the vehicle body, which is used because it may closely resemble a typical automobile end profile. This slant angle α, however, tends to result in a highly three-dimensional near-wake, which produces a high drag coefficient due to creation of random eddy motion of the air flow about the rear of the vehicle body 100, which increases drag. In testing of the Ahmed body shown in the embodiment illustrated in FIG. 1 in a wind tunnel with dimensions of about 1.4 meters high, 1.87 meters wide, and 8.35 meters in length, a slant angle of 25° was found to correspond to a favorable blockage ratio of 4.3% of the vehicle body 100 within the wind tunnel, defined by the frontal area of the vehicle body divided by the total cross-sectional area of the wind tunnel.

To reduce drag on the vehicle body 100, a series of slot jets 106A-D were first implemented on the rear face 108 of the rear end profile 102 of the vehicle body, such as indicated in FIG. 2. The location of each slot jet as discussed herein corresponds to the respective outlet of each jet. The location of the inlet for some or all of the slot jets may vary, but should correspond to areas of high pressure in order to at least partially facilitate flow in a passive manner. One such area of high pressure may exist within the rear wheel wells of a passenger vehicles. The slot jets 106A-D can be formed with jet thicknesses generally ranging from about 5 mm to about 15 mm or greater for the Ahmed body, corresponding to a thickness of between about 20 mm and about 25 mm for a midsize passenger vehicle. For example, in some preferred embodiments, each slot jet 106A-D can have a thickness of about 10-12 mm when applied to the Ahmed body, though their thicknesses can vary. Each of the slot jets 106A-D implemented along the vehicle body 100 in FIG. 2 is configured as a continuously emitting slot jet. Each slot jet 106A-D is arranged about or along the rear face 108 of the vehicle body, including being formed adjacent the peripheral edges of the rear face of the vehicle body in FIG. 2, at locations offset from the slant surface 110. The slot jets 106A-D are configured to emit air in a steady or continuous fashion. In other words, the slot jets (i.e. the outlets thereof) are not intended to pull in air or act in a predetermined pulsed manner. As used herein, a flow of emitted air is the result of flow is a direction opposite the front end profile 104 of the vehicle body 100. The flow may be created actively with fans, flow may be the passive result of flow across a pressure differential, or flow may result from a combination of active and passive systems. The thicknesses and location of the slot jets 106A-D, including their positioning, and spacing of the slot jets about the rear face 108 at spaced positions thereabout, generally will be selected to define a slot jet configuration to provide/generate output air jet velocities of about 20 m/s or less directed rearwardly from the rear face of the vehicle body when the vehicle is traveling approximately 21 m/s.

FIGS. 3A and 3B illustrate alternative configurations for the velocity provided by a bottom slot jet 106B near the bottom edge of the rear face 108 of the vehicle body 100. As discussed further below, the discharge angle β for the bottom slot jet 106B was tested for its effect on drag reduction.

FIG. 4 shows another embodiment where a slant slot jet 106E is provided along the slant surface 110 of the vehicle body 100.

Figure 5A:
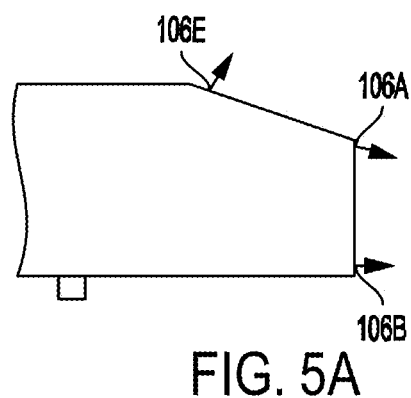
FIGS. 5A-5C illustrate flow from the slot jets of FIGS. 2 and 4 according to various embodiments.
Figure 5B:
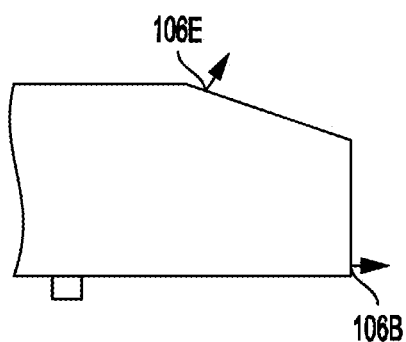
Figure 5C:
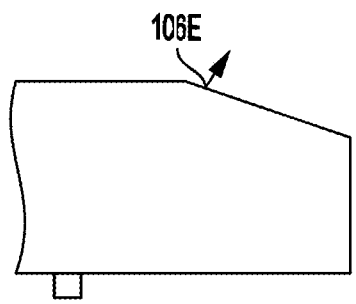

FIGS. 5A-5C schematically show flow selected from the slot jets 106A, 106B, and 106E according to further alternative embodiments.

The output jet velocities, including speed and discharge angle, thus provided by the slot jets 106A-E are selected to be sufficient to modify and/or disrupt the swishing or random eddy motion of the air flow wake generated by the vehicle body 100 as it moves through an ambient environment to provide enhanced/optimized control of the air flow separation at the rear end profile 102 of the vehicle body. The inventors determined that varying individual jet velocities (i.e. speeds) of the slot jets 106A-E was generally less effective for drag reduction. Jet velocities (i.e. speeds) above an inlet velocity (i.e. speed) of air flow into a wind tunnel ($U_{inlet}$) (e.g. the speed of the vehicle body 100) showed an increase in drag. Thus the flow velocity from the jets should be less than the forward velocity of the vehicle. This would be expected when the flow velocity is the result of a passive system that relies upon vehicle motion to create the pressure difference that generates the desired flow through the slot jets. The passive slot jets would also be able to naturally adjust flow velocity as a function of vehicle speed. It is expected fan-assisted flow may only be use at high vehicle speeds. An example of high vehicle speeds may be in excess of about 35 mph. The size and location of the slot jets 106A-E along the vehicle body 100 will be balanced against the output jet velocities provided by the jets to provide an optimal net reduction in drag acting on the vehicle body.

Accordingly, in the system of the present disclosure as shown in FIGS. 3A and 3B, the discharge angle β of one or more of the bottom slot jets 106B of a lower portion of the vehicle body 100 that is located below a central horizontal plane P of the vehicle body will be approximately the same as the discharge angle β of corresponding ones of the top slot jets 106A of an upper portion of the vehicle body located above the central horizontal plane of the vehicle body on the rear face 108.

Computational Models

The DES turbulence model is a hybrid modeling method that utilizes features of the Reynolds-Averaged Navier Stokes (RANS) turbulence model in combination with large eddy simulation (LES). DES models are set up to solve shear layers using the RANS equations, while utilizing LES for the unsteady separation regions. The RANS equations used for the DES turbulence modeling are shear stress transport (SST) k-ω. Furthermore, the use of Improved Delayed Detached Eddy Simulation (IDDES) of Shur et al. may be beneficial implemented for this simulation.

For testing, in one embodiment, the following example boundary conditions for model tests were utilized. It will be understood that variations or changes can be made thereto in accordance with the principles of the present invention. At the inlet, the speed was varied such that $21 < U_{inlet} < 42$ m/s, which corresponds to Re=1.4 to 2.8 million, respectively. The turbulent viscosity ratio was set to 200 and the turbulence intensity was 0.02. A zero gage pressure was set at the outlet and a no-slip condition was applied to the walls of the wind tunnel. The speed of all four slot jets 106A-D was set equal and varied from about 9 m/s to about 40 m/s. The side slot jets 106C, D were modeled as boundary normal velocity inlets. The direction of the exit velocity (discharge angle β) of the top slot jet 106A was 25° below horizontal, generally parallel to the slant surface 110 of the Ahmed body. The direction (i.e. discharge angle β) of the bottom slot jet's 106B velocity was varied from 0 to 25° above the horizontal to counterbalance (i.e. provide an equal and opposite direction) the top slot jet's 106A vertical force.

Numerical Simulations

Simulations are conducted with the use of CD-adapco Star-CCM+ version 7.06.009. Star-CCM+ is a 3D finite volume solver which uses a blending factor computed according to flow field characteristics, to combine a hybrid second-order upwind and central scheme when considering discretization. The code includes a plug-in, Optimate+, which is implemented for optimization of the slot jets. Optimate+ uses Red Cedar Technology's SHERPA optimization algorithm.

A mesh independence study was conducted to verify an adequate grid. Four simulations were run with 17.78, 20.5, 24.2, and 28.3 million unstructured polyhedral cells. The difference in $C_d$ values between the 20.5 million cells, selected for the study, and the finest grid size, 28.3 million cells, was less than 2%. To verify capture of the boundary layer, y+ values were under 4.0. FIG. 4 depicts the mesh at the vertical mid-plane of the domain.

A time-step independence study was also conducted. Several time steps were tested and a time step $\Delta t=0.01$ s was used. Since macro-scale vortex shedding at the rear was of most importance, a time step of $\Delta t=0.01$ s was chosen. This time step is appropriate considering the period of the vortex shedding at the rear end of the body. It has been experimentally determined that the Strouhal number for the rear of an Ahmed body is ≈0.2. Considering a freestream velocity of 21 m/s, the vortex shedding period is ≈0.25 s. The total simulation time is 1.5 seconds (convergence occurred at t=0.5 s) with results averaged from t=0.75 to 1.5 s.

Computational Results

Figure 6:
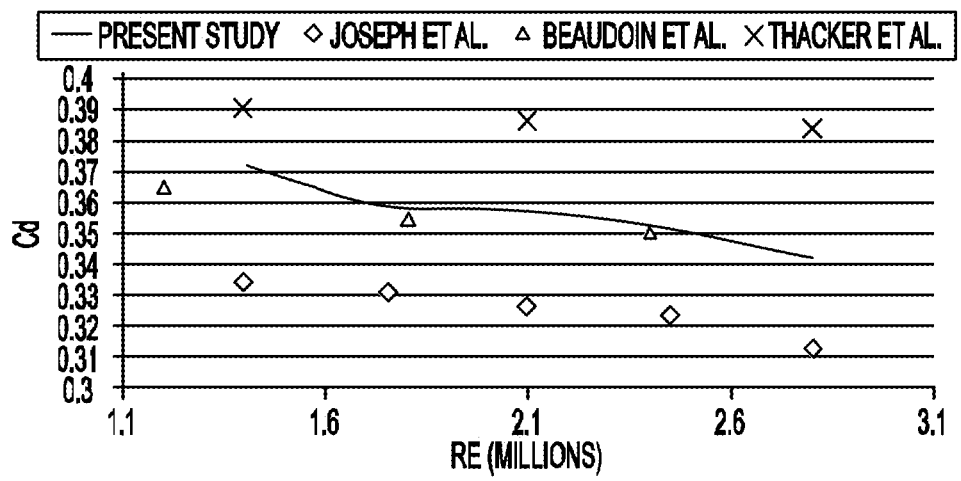
FIG. 6 illustrates a drag coefficient ($C_d$) as a function of a Reynolds number (RE) for the simulation and experiments using the vehicle body of FIGS. 1-3.

The present results were compared to the experiments of Beaudoin et al., Thacker et al., and Joseph et al. These investigators experimentally determined the drag coefficient as a function of Reynolds number. The Reynolds number for an Ahmed body is defined as $$Re = \frac{\rho U_{inlet} L}{\nu} \quad (4)$$

where $\rho$ is density, $U_{inlet}$ is the wind tunnel inlet velocity (speed) and L is the characteristic length of the Ahmed body (1.044 m). In the experiments, the investigators noticed a decrease in the coefficient of drag $C_d$ with increasing Reynolds number. The present simulations showed a similar trend (FIG. 6). The high drag scenario of Re=1.4 million ($U_{inlet}=21$ m/s) was chosen for this drag reduction study ($C_d=0.371$).

TABLE 1

DOE study results, *denotes baseline

| h (mm) | $C_d$ | φ | $C_d$ |
|---|---|---|---|
| 39.2 | 0.336* | 0 | 0.336* |
| 27.2 | 0.337 | 5 | 0.334 |
| 15.2 | 0.335 | 10 | 0.331 |
| 3.2 | 0.337 | 15 | 0.330 |
|  |  | 20 | 0.328 |
|  |  | 25 | 0.3225 |

Figure 7:
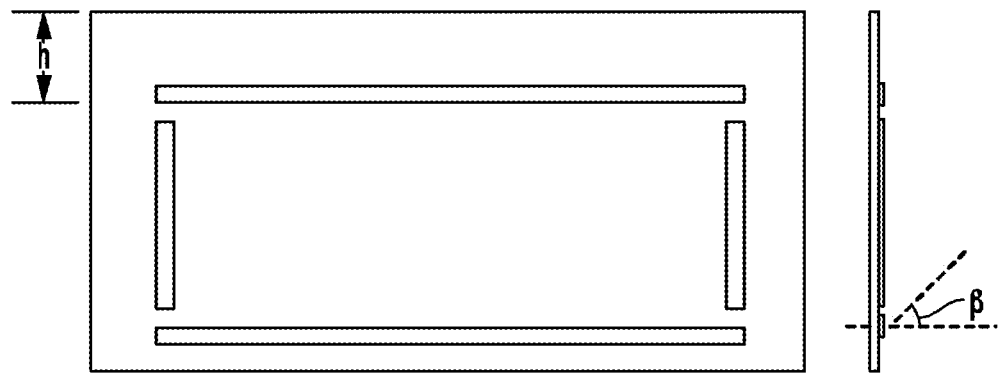
FIG. 7 illustrates a design of experiment variables.

A design of experiment (DOE) study was conducted to determine the impact of the discharge angle β of the bottom slot jet 106B, as well as the distance (h) from the top slot jet 106A and the slant surface 110. For this part of the study, 15 m/s was chosen as the jet velocity (speed). This velocity coupled with the original geometry had a $C_d$ of 0.336. This was the benchmark used for the DOE study. FIG. 7 depicts the height h and the discharge angle β of the slot jet 106B formed in the vehicle body 100 that were modified in the DOE. The height h was varied from 39.2 to 3.2 mm in increments of 12 mm. The discharge angle β was modified from 0° to 25° in 5° increments. Modifying the dimension h generally was proven to be relatively insignificant, with the $C_d$ within about 1% of the benchmark value. Where the discharge angle β equaled 25° for the bottom slot jet 106B, an approximately 3% reduction ($C_d=0.3225$) in $C_d$ from the benchmark value of 0.336 was shown. Therefore, it was determined that a discharge angle of about 25° for the bottom slot jet 106B may be preferred. Results for the DOE study are shown in Table 1 above. This table shows the results of different vehicle body simulations that were run and which had an optimal coefficient of drag ($C_d$).

Figure 8:
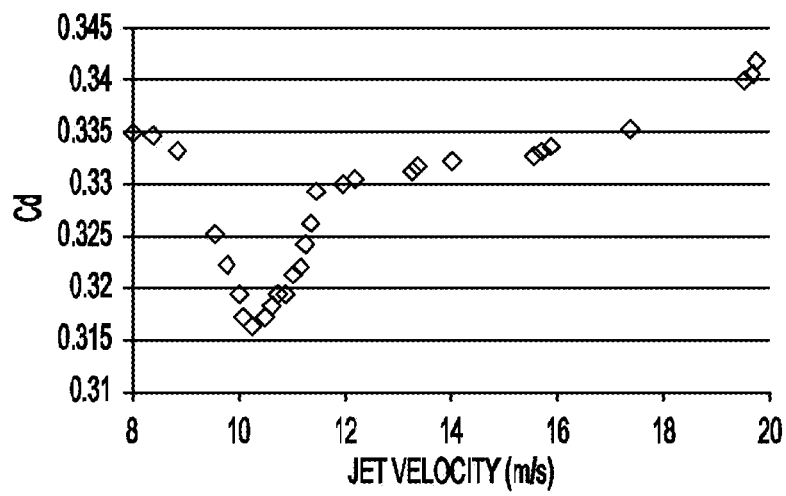
FIG. 8 illustrates a drag coefficient $C_d$ vs. jet velocity for $\alpha=0°$.

An initial optimization study was conducted with a discharge angle of β=0° for the bottom slot jet 106B. The jet velocity was varied between 8 and 20 m/s, and 30 simulations were run. The objective function of the optimization was to minimize the averaged $C_d$ (0.75≤t≤1.5 s). FIG. 8 shows the results from the initial optimization. The optimal $C_d$ was 0.316 corresponding to a jet velocity of about 10.28 m/s, a 14.8% reduction from the initial 0.371 when the inlet velocity was set to 21 m/s.

Figure 9:
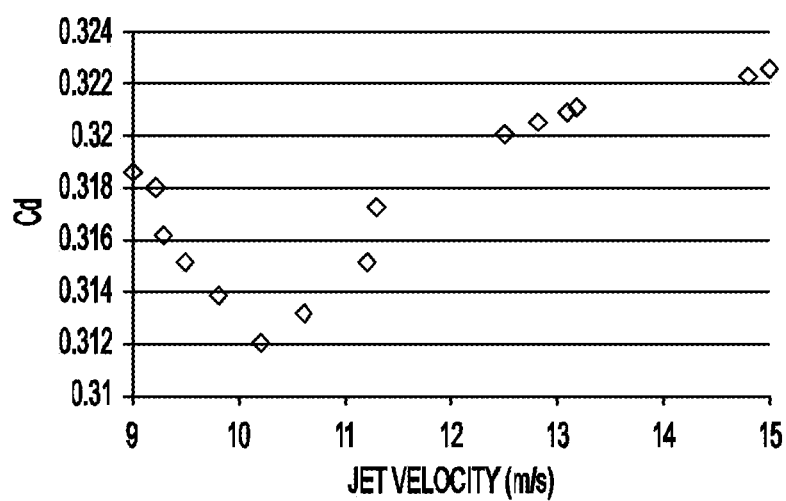
FIG. 9 illustrates a drag coefficient $C_d$ vs. jet velocity for $\alpha=25°$.

A second optimization study was conducted with a discharge angle of β=25° for the bottom slot jet 106B and with jet velocity varied between 9 and 15 m/s. This optimization study was run for 15 iterations with the results presented in FIG. 9. The optimized $C_d$ of 0.312 (about a 16% reduction) was found to correspond to a jet velocity of about 10.2 m/s.

Returning to the embodiments of FIGS. 4 and 5, a slot jet 106E also can be added to the slant surface 110 of the vehicle body 100. All cases were run for discharge angle β=0°. This means that the slant slot jet 106E had an initial discharge angle perpendicular to the slant surface 110. Three scenarios were examined (see FIGS. 5A-C for a schematic diagram). The first case (FIG. 5A) implemented all three slot jets (slant 106E, top 106A, and bottom 106B). The second case (FIG. 5B) investigated the slant slot jet 106E and the bottom slot jet 106B, and the third case (FIG. 5C) was for the slant slot jet 106E only. For the first two cases, the drag coefficients represent a 10% reduction in drag from the equivalent case with the top and bottom slot jets 106A, B only (Table 3) of $C_d=0.315$. For the third case, with the slant slot jet 106E only, the $C_d$ value represents a 7.5% reduction in drag. The difference in $C_d$ between the slant jet 106E case and the slant jet plus rear slot jets 106A,B case is approximately 3%. The volumetric flow rate of each rear slot jet is 69 cfm (0.033 m³/s).

Flow Visualization

FIGS. 10-12 compare the results of the most optimal case with the unmodified Ahmed body without jets. The results of velocity and pressure were averaged over the same time period (0.75≤t≤1.5 s) as before to compare the two cases.

Figure 10A:
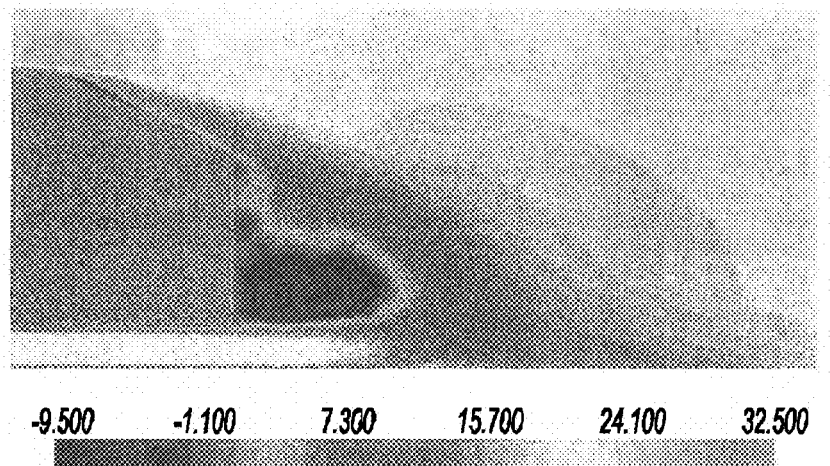
FIG. 10A illustrates the velocity in the x-direction (m/s) at a mid-plane without jets.
Figure 10B:
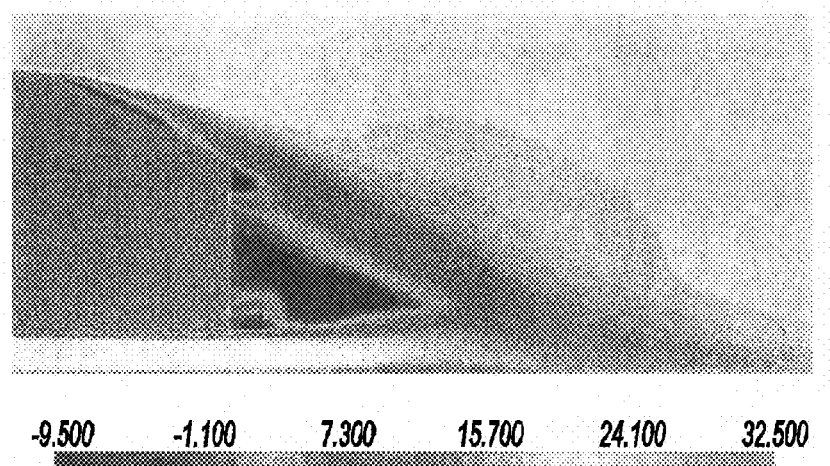
FIG. 10B illustrates the velocity in the x-direction (m/s) at a mid-plane with jets along the vehicle body.

In FIGS. 10A and 10B, time-averaged velocity in the x-direction is shown. The case without the jets (FIG. 10A) has a larger area of recirculation than with the jets (FIG. 10B), as well as a rounded wake structure. The flow under the Ahmed body also has less energy in the standard case compared with the optimal. This fluid structure helps reduce drag by minimizing the vortex interaction with the flow field.

Figure 11A:
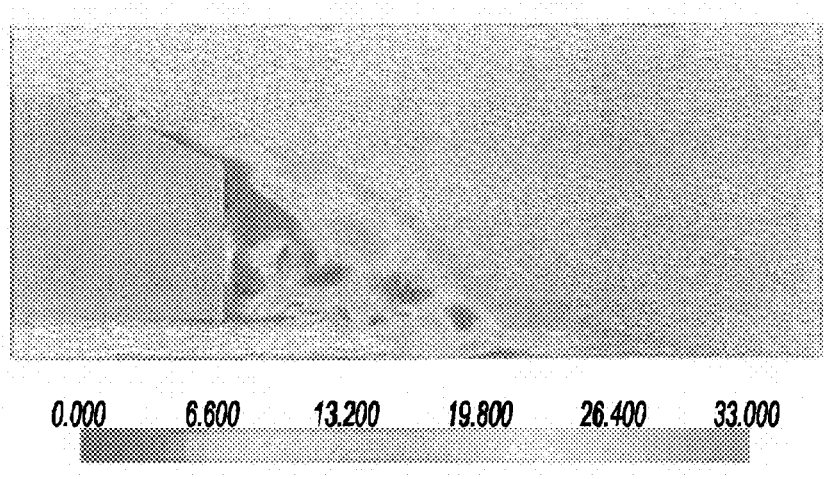
FIG. 11A illustrates the pressure (Pa) at the mid-plane without jets along the vehicle body.
Figure 11B:
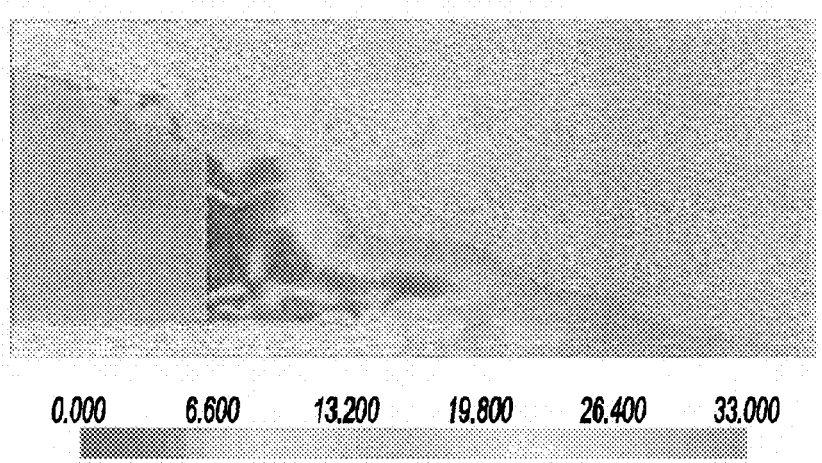
FIG. 11B illustrates the pressure (Pa) at the mid-plane with jets along the vehicle body.

FIGS. 11A and 11B show Line Integral Convolution (LIC) of the velocity vector magnitude on the mid-plane of the geometry. LIC was first introduced by Cabral and Leedom, as a way to visualize complex vector fields. The figures again show a more energized flow under the Ahmed body, as well as a more structured wake in the jet case (FIG. 11B).

Figure 12A:
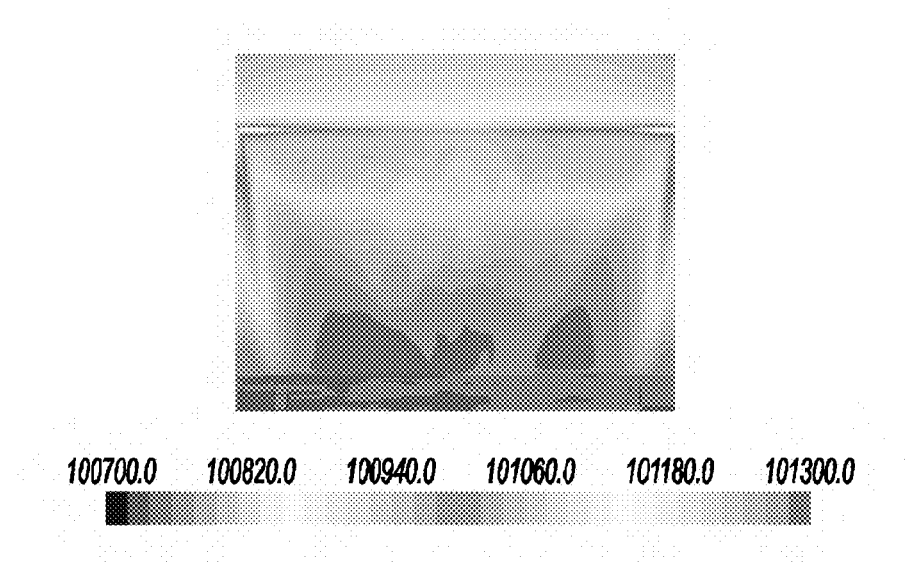
FIG. 12A illustrates the surface pressure (Pa) on the rear slant without jets along the vehicle body.
Figure 12B:
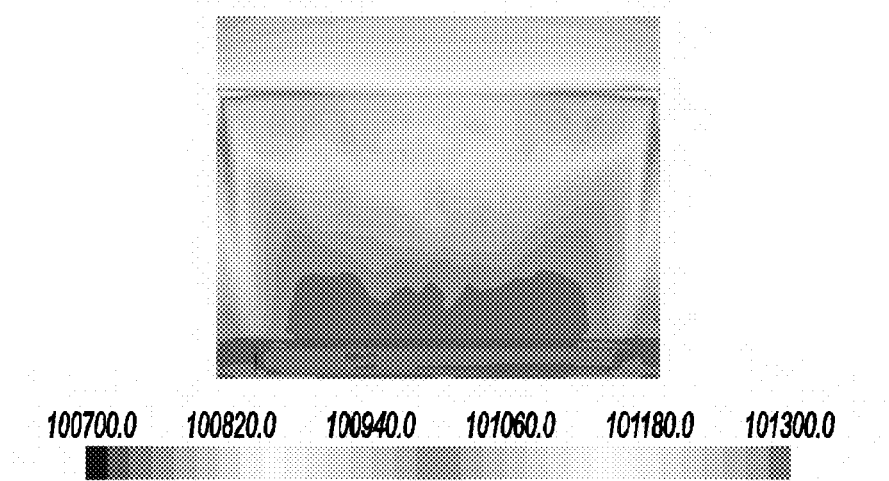
FIG. 12B illustrates the surface pressure (Pa) on the rear slant with jets along the vehicle body.

The surface pressure contour diagrams of the rear slant and adjacent rear face are shown in FIGS. 12A and 12B. The case with the jets (FIG. 12B) have a larger area of high pressure on the rear face and trailing edge of the rear slant. The leading edge of the rear slant also has higher pressure than the case without the jets (FIG. 12A).

To conclude, several locations for the slot jets 106A-E were investigated along with varying the velocity (both speed and discharge angle) of the jets relative to a predetermined vehicle speed. A total net drag reduction of about 16% was accomplished using approximately 10 mm thick slot jets 106A, 106B located along the rear face 108 of an Ahmed body with a rear slant angle of about 25°, and which produced a blowing or output air flow with a velocity of about 10.2 m/s given an input velocity of 21 m/s to the wind tunnel. A discharge angle β of about 25° was shown to be effective at drag reduction for the bottom slot jet 106B when a corresponding top slot jet 106A has a similar discharge angle corresponding to the slant angle α of the vehicle body 100. As a result, the slot jet 106A located along an upper portion of the rear face 108 of the vehicle body 100 will provide a vertical velocity component substantially equal to and opposite the velocity component produced by corresponding ones of the bottom slot jets 106B located along a lower portion of the rear face of the vehicle body.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

NOMENCLATURE $C_d$ coefficient of drag
$C_{des}$ model constant
$C_\mu$ turbulent constant
$D_k$ hybrid length scale
$F_d$ wall blending function
$f_e$ wall blending function
g blending function
h distance from top jet to rear slant
k turbulent kinetic energy
L characteristic length of the Ahmed body
$l_{HYBRID}$ hybrid length scale coefficient
Re Reynolds number
$S_r$ roughness parameter function
t time
u* friction velocity
$U_{inlet}$ wind tunnel inlet velocity
y Cartesian coordinate
y+ dimensionless wall distance
Greek
$\Delta_{IDDES}$ mesh length scale
Δt time step
ω specific dissipation rate
κ von Karman constant
ν kinematic viscosity
μ angle of the bottom jet
ρ density

The invention claimed is:

1. A system of wake control for a passenger ground vehicle to help promote increased fuel efficiencies of the ground vehicle, comprising:
   at least one slot jet comprising an inlet and an outlet located along a rear profile portion of a body of the ground vehicle, the rear profile portion of the ground vehicle comprising a substantially vertical portion and a slant surface extending at least partially between the substantially vertical portion and a top portion of the body of the ground vehicle, the outlet of the at least one slot jet extending at least partially along the slant surface of the rear profile portion of the body of the ground vehicle, and wherein the inlet of the at least one slot jet extends at least partially along the body of the ground vehicle and is arranged substantially adjacent a bottom surface of the ground vehicle;
   wherein the outlet of the at least one jet provides a substantially continuous flow of air at a non-zero velocity when the ground vehicle is moving in a forward direction, the non-zero velocity flow of air being at least partially directed in a rearward direction with an output velocity less than a velocity at which the ground vehicle is moving in the forward direction, but sufficient to modify an air flow wake generated by the ground vehicle moving in the forward direction, and
   wherein the outlet of the at least one slot jet is configured to direct the flow of air at an initial angle substantially parallel with the slant surface of the rear profile of the ground vehicle.

2. The system of wake control of claim 1, further comprising:
   at least additional one slot jet having an outlet configured to direct a flow of air at an initial angle substantially perpendicular to the rear of the ground vehicle.

3. A passenger ground vehicle, comprising:
   a vehicle body comprising a top portion and a rear profile portion substantially adjacent the top portion, the rear profile portion comprising a generally vertical portion and a slant surface between the generally vertical portion and the top portion of the vehicle body; and
   a plurality of slot jets arranged along the vehicle body, the slot jets comprising at least one top slot jet positioned above a center horizontal plane of the vehicle body, and at least one bottom slot jet positioned below the center horizontal plane of the vehicle body,
   wherein each of the plurality of slot jets is configured to provide a substantially continuous flow of air at a non-zero velocity therethrough when the vehicle is moving in a forward direction, the non-zero velocity of the flow of air from each of the slot jets being at least partially directed in a rearward direction with an output velocity less than a velocity at which the ground vehicle is moving in the forward direction, but sufficient to modify an air flow wake generated by the movement of the ground vehicle in the forward direction, and
   wherein a degree of a discharge angle of the flow of air from the at least one top slot jet is angled below the central horizontal plane and is substantially equal to a degree to which a discharge angle of the flow of air from the bottom slot jet is angled above the horizontal.

4. A passenger ground vehicle, comprising:
   a vehicle body comprising a top portion and a rear profile portion substantially adjacent the top portion, the rear profile portion comprising a generally vertical portion and a slant surface between the generally vertical portion and the top portion of the vehicle body; and
   a plurality of slot jets arranged along the vehicle body, the slot jets comprising at least one top slot jet positioned above a center horizontal plane of the vehicle body, and at least one bottom slot jet positioned below the center horizontal plane of the vehicle body, wherein each of the plurality of slot jets is configured to provide a substantially continuous flow of air at a non-zero velocity therethrough when the vehicle is moving in a forward direction, the non-zero velocity of the flow of air from each of the slot jets being at least partially directed in a rearward direction with an output velocity less than a velocity at which the ground vehicle is moving in the forward direction, but sufficient to modify an air flow wake generated by the movement of the ground vehicle in the forward direction, wherein a degree of a discharge angle of the flow of air from the top jet is angled below the center horizontal plane and is substantially equal to a degree to which a discharge angle of the flow of air from the bottom slot jet is angled above the horizontal; and wherein the discharge angle of the top slot jet is configured to be substantially parallel with a slant surface of a portion of the rear of the ground vehicle.

5. The system of wake control of claim 1, further comprising a plurality of slot jets, wherein each slot jet of the plurality of slot jets emits air with substantially the same speed.

6. The system of wake control of claim 1, wherein the flow of air from the at least one slot jet is the result of a passive pressure differential between the inlet and the outlet of the at least one slot jet.

7. A ground vehicle, comprising:
a vehicle body having a substantially horizontal top surface, a substantially vertical rear face and a slant surface extending at least indirectly between the top surface and the vertical rear face, the slant surface declined at a slant angle of a to the horizontal;
a plurality of slot jets configured to provide a substantially continuous flow of air in a direction and at a speed sufficient to substantially disrupt an air flow wake created by movement of the vehicle body in a forward direction, wherein an initial speed of the flow of air from the plurality of slot jets is less than a speed of the vehicle body moving in the forward direction, and
wherein the plurality of slot jets comprises:
a first slot jet positioned along the slant surface of the vehicle body and configured to discharge air in an initial discharge direction substantially parallel with the slant surface, and
a second slot jet positioned on the substantially vertical rear face of the vehicle body and configured to discharge air at an initial discharge angle substantially equal and opposite to the discharge direction of the first slot jet relative to the horizontal.

8. The ground vehicle of claim 7, wherein each slot jet of the plurality of slot jets is sized, positioned, and configured to discharge a flow of air at initial angle such that the plurality of slot jets provide a balanced flow of air to optimize reduction in drag.

9. The ground vehicle of claim 7, wherein a size, position and initial discharge angle slot jets of the plurality of slot jets is balanced with respect to the size, position and initial discharge angle of other ones of the plurality of slot jets so as to generate at least partially opposing flows of air introduced into the airflow wake of the vehicle body sufficient to provide a total net drag reduction of at least about 16%.

10. A ground vehicle, comprising:
a vehicle body having a substantially horizontal top surface, a substantially vertical rear face and a slant surface extending at least indirectly between the top surface and the vertical rear face, the slant surface declined at a slant angle of a to the horizontal;
a plurality of slot jets configured to provide a substantially continuous flow of air in a direction and at a speed sufficient to substantially disrupt an air flow wake created by movement of the vehicle body in a forward direction, wherein an initial speed of the flow of air from the plurality of slot jets is less than a speed of the vehicle body moving in the forward direction, and
wherein the plurality of slot jets comprises:
a first slot jet positioned on the slant surface and configured to discharge air at an initial angle substantially perpendicular to the slant surface,
a second slot jet positioned on the rear face and configured to discharge air in an initial discharge direction substantially parallel with the slant surface, and
a third slot jet positioned on the rear face and configured to discharge air at an initial discharge angle substantially equal and opposite to the discharge direction of the second slot jet relative to the horizontal.

11. The ground vehicle of claim 7, wherein the flow of air is passively created, and at least one slot jet of the plurality of slot jets has an inlet positioned within a wheel well of the vehicle.

12. A method of increasing the fuel efficiency of a ground vehicle, comprising:
reducing the drag on the ground vehicle at speeds above 45 mph, where the ground vehicle includes a vehicle body having a rear portion that includes a substantially horizontal top surface, a substantially vertical rear face, and a slant surface extending at least indirectly between the top surface and the vertical rear face, the slant surface declined at a slant angle of $\alpha$ to the horizontal, and wherein reducing drag comprises:
locating a first slot jet along the slant surface;
locating a second slot jet along the vertical rear face;
generating a substantially continuous flow of air from the first and second jets, and directing the flow of air from the first slot jet rearwardly and at an angle substantially perpendicular to the slant surface and directing the flow of air from the second jet rearwardly and in a direction;
wherein the substantially continuous flows of air from the first and second jets are output at a velocity balanced against a size and the location of the slot jets sufficient to create an optimal drag reduction for the configuration of the vehicle body.

13. The method of claim 12, wherein the second slot jet directs the flow of air in a direction parallel with the slant surface.

14. The method of claim 12, wherein reducing drag further comprises:
generating a flow of air from a third slot jet, the third slot jet located on the vertical rear face below the second slot jet.

15. The method of claim 14, wherein the flow of air from the third slot jet is directed at a discharge angle with an upward vertical component.

16. The method of claim 12, further comprising:
optimizing drag reduction by providing at least one additional slot jet and balancing air flows introduced into an air flow wake created by movement of the vehicle between the first slot jet and the at least one additional slot jet.

* * * * *